(12) United States Patent
Gupta et al.

(10) Patent No.: US 12,424,240 B2
(45) Date of Patent: Sep. 23, 2025

(54) SYSTEMS AND METHODS FOR DYNAMICALLY ADJUSTING A LISTENING TIME OF A VOICE ASSISTANT DEVICE

(71) Applicant: SAMSUNG ELECTRONICS CO., LTD., Suwon-si (KR)

(72) Inventors: Lahar Gupta, Noida (IN); Sachin Chugh, Noida (IN); Mangi Lal Sharma, Noida (IN); Mohit Sharma, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 275 days.

(21) Appl. No.: 18/135,500

(22) Filed: Apr. 17, 2023

(65) Prior Publication Data

US 2023/0306986 A1 Sep. 28, 2023

Related U.S. Application Data

(63) Continuation of application No. PCT/KR2023/003420, filed on Mar. 14, 2023.

(30) Foreign Application Priority Data

Mar. 24, 2022 (IN) .............................. 202211016620

(51) Int. Cl.
*G10L 25/78* (2013.01)
*G10L 15/22* (2006.01)
*G10L 25/93* (2013.01)

(52) U.S. Cl.
CPC .............. *G10L 25/78* (2013.01); *G10L 15/22* (2013.01); *G10L 25/93* (2013.01); *G10L 2015/227* (2013.01); *G10L 2025/786* (2013.01)

(58) Field of Classification Search
CPC ......... G10L 25/78; G10L 15/22; G10L 25/93; G10L 2015/227; G10L 2025/786; G10L 15/04; G10L 2015/223
See application file for complete search history.

(56) References Cited

U.S. PATENT DOCUMENTS

| 9,542,941 B1 | 1/2017 | Weksler et al. |
| 10,923,101 B2 * | 2/2021 | Guo .................. G10L 15/26 |

(Continued)

FOREIGN PATENT DOCUMENTS

| EP | 2 806 415 B1 | 11/2016 |
| JP | 11-249773 A | 9/1999 |

(Continued)

OTHER PUBLICATIONS

International Search Report (PCT/ISA/210) issued by the International Searching Authority on Jun. 13, 2023 in International Patent Application No. PCT/KR2023/003420.

(Continued)

*Primary Examiner* — Abul K Azad
(74) *Attorney, Agent, or Firm* — Sughrue Mion, PLLC

(57) ABSTRACT

A method of adjusting a predefined listening time of a voice assistant device includes receiving an audio input; extracting at least one of a speech component and a non-speech artifact from the audio input; determining a user breathing pattern based on the at least one of the speech component and the non-speech artifact; identifying at least one attribute that impact the user breathing pattern based on at least one non-speech component, captured from an environment and the voice assistant device; determining, after detecting a pause in the audio input, whether a user's intention is to continue a conversation based on an analysis of the user breathing pattern and the at least one attribute; and dynamically adjusting the predefined listening time of the voice assistant device to continue listening for voice commands in (Continued)

the conversation based on a determination that the user's intention is to continue the conversation.

20 Claims, 14 Drawing Sheets

(56) References Cited

U.S. PATENT DOCUMENTS

| | | | |
|---|---|---|---|
| 11,257,487 B2* | 2/2022 | Casado | G10L 15/00 |
| 2014/0191939 A1 | 7/2014 | Penn et al. | |
| 2016/0077794 A1 | 3/2016 | Kim et al. | |
| 2019/0325970 A1* | 10/2019 | Nagashima | G11C 16/34 |
| 2019/0348065 A1* | 11/2019 | Talwar | G10L 25/78 |
| 2019/0378493 A1 | 12/2019 | Kim et al. | |
| 2020/0219513 A1 | 7/2020 | Aguayo et al. | |
| 2020/0335128 A1* | 10/2020 | Sheeder | G10L 25/87 |

FOREIGN PATENT DOCUMENTS

| | | |
|---|---|---|
| JP | 11-288293 A | 10/1999 |
| JP | 2012-32557 A | 2/2012 |
| JP | 2017-116747 A | 6/2017 |
| JP | 2018-17776 A | 2/2018 |
| JP | 2021-157010 A | 10/2021 |
| KR | 10-2021-0101645 A | 8/2021 |

OTHER PUBLICATIONS

Written Opinion (PCT/ISA/237) issued by the International Searching Authority on Jun. 13, 2023 in International Patent Application No. PCT/KR2023/003420.

Venkata Srikanth Nallanthighal et al., "Deep learning architectures for estimating breathing signal and respiratory parameters from speech recordings", Neural Networks, Sep. 2021, vol. 141, pp. 211-224.

Kristin McClure et al., "Classification and Detection of Breathing Patterns with Wearable Sensors and Deep Learning", Sensors, Nov. 13, 2020, vol. 20, Issue: 22, 13 pages.

Chen-Hsuan (Iris) Shih et al., "Breeze: Smartphone-based Acoustic Real-time Detection of Breathing Phases for a Gamified Biofeedback Breathing Training", Proceedings of the ACM on Interactive, Mobile, Wearable and Ubiquitous Technologies, Dec. 2019, vol. 3, Issue: 4, Article No. 152, pp. 1-30.

Ben Patterson, "How to set Alexa and Google Assistant to listen for follow-up questions and commands", TechHive, Feb. 11, 2020, 4 pages total, URL: https://www.techhive.com/article/578300/how-to-set-alexa-and-google-assistant-to-listen-for-follow-up-questions.html.

Laura Tate, "Voice Recognition Technology Challenges In 2020, Possibilities For The Future", 2020, 7 pages total, Kardome, URL: https://www.kardome.com/blog-posts/voice-recognition-technology-challenges-2020-possibilities-future.

Patricia Scanlon, "Voice assistants don't work for kids: The problem with speech recognition in the classroom", TechCrunch, Sep. 10, 2020, 6 pages total, URL: https://techcrunch.com/2020/09/09/voice-assistants-dont-work-for-kids-the-problem-with-speech-recognition-in-the-classroom/?guccounter=1&guce_referrer=aHR0cHM6Ly93d3cuZ29vZ2xlLmNvbS8&guce_referrer_sig=AQAAAHJ4jujyTrPgyAb44074WWWzzczxVomelhvGVsMH3BGUAipMTGbaXi4kDB5WusmzfJ-6b4bs8B9XfLEd9IO3wddkqRAEy5RTp4F5GW-wiMNkflTaUJigoroeK9y2QMGgPsda19mm7DoFjyS_4400KXiISS3K361KK7b2Zd_1VYgD.

Communication issued from the Indian Patent Office on May 7, 2025 to Indian Patent Application No. 202211016620.

* cited by examiner

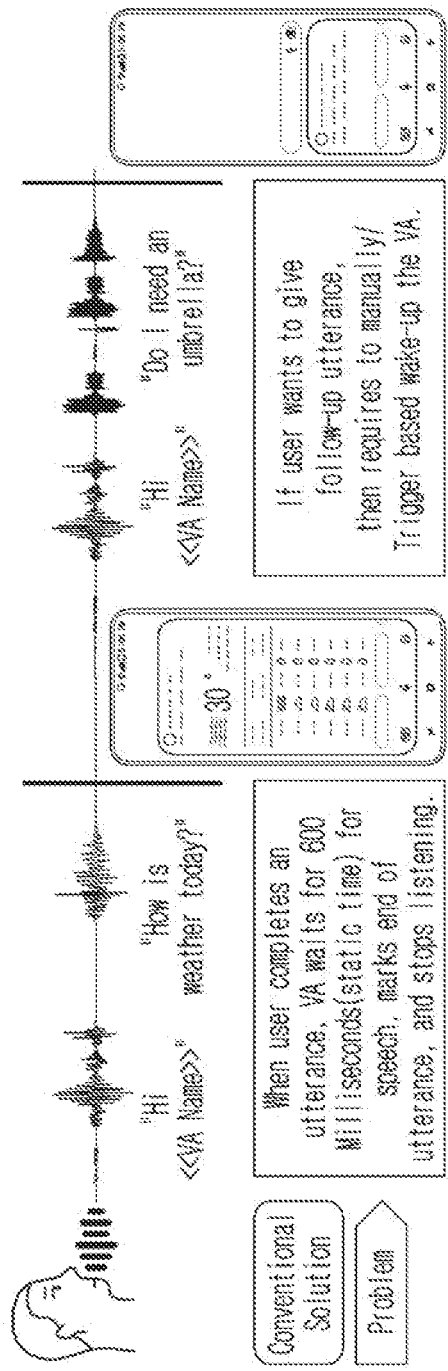

SYSTEMS AND METHODS FOR DYNAMICALLY ADJUSTING A LISTENING TIME OF A VOICE ASSISTANT DEVICE

CROSS-REFERENCE TO RELATED APPLICATION(S)

This application is a bypass continuation of PCT International Application No. PCT/KR2023/003420, which was filed on Mar. 14, 2023, and claims priority to Indian provisional application No. 202211016620, filed on Mar. 24, 2022 in the Indian Intellectual Property Office, the disclosures of which are incorporated herein by reference in their entireties.

BACKGROUND

1. Field

The disclosure relates to voice assistant devices, and more particularly to systems and methods for dynamically adjusting a predefined listening time of a voice assistant device.

2. Description of Related Art

In the voice recognition field, voice assistants have found applications in many areas like smart phone, smart TV, smart speaker, smart home, connected cars, robotics etc. They support voice commands, voice searching, and voice-activated device control. They are able to capture, detect end point, and execute the user commands. Improvements are continuously being done in this field for enhancing user experience.

In existing voice assistants, users need to again and again activate the mic by saying wake-up words like "Hi «Voice Assistant Name»"", pressing wakeup button, or by clicking on mic, which is very inconvenient and unnecessary increases the latency in case of continuation and follow-up commands. The existing voice assistants are incapable of predicting whether a user intends to speak more during pause phases, and so the voice assistants stop listening after a static time leading to incomplete utterance from user's perspective.

Accordingly, there is a need for a system which can recognize user's intention and adjust mic awake time. Further, there is a need for a system which can recognize user's intention to speak more and adjust mic listening time accordingly.

SUMMARY

According to an aspect of the disclosure, a method of dynamically adjusting a predefined listening time of a voice assistant device, includes: receiving, by the voice assistant device, an audio input; extracting at least one of a speech component and a non-speech artifact from the audio input; determining a user breathing pattern based on the at least one of the speech component and the non-speech artifact; identifying at least one attribute that impact the user breathing pattern based on at least one non-speech component, captured from an environment and the voice assistant device; determining, after detecting a pause in the audio input, whether a user's intention is to continue a conversation based on an analysis of the user breathing pattern and the at least one attribute; and dynamically adjusting the predefined listening time of the voice assistant device to continue listening for voice commands in the conversation based on a determination that the user's intention is to continue the conversation.

The method may further include: detecting the pause of a specific time duration after receiving the audio input; and dynamically adjusting the predefined listening time of the voice assistant device based on the specific time duration of the pause to continue listening for the voice commands in the conversation after the pause.

The method may further include determining the user breathing pattern using one of an audio spectrogram and a waveform analysis.

The method may further include determining an intention-to-speak more (ISM) coefficient based on the analysis of the user breathing pattern and the at least one attribute; and dynamically adjusting the predefined listening time of the voice assistant device based on the ISM coefficient and a speech threshold value.

The at least one non-speech component may include at least one of an environment noise, microphone channel noise, and non-speech artifacts.

The method may further include: suspending a requirement of receiving a hot word to continue listening for the voice commands, based on dynamically adjusting the predefined listening time of the voice assistant device.

The at least one attribute may include at least one of environmental parameters, user data, and voice assistant device data.

The speech component may include at least one of phonemes and graphemes, and where the non-speech artifact may include at least one of breathing sounds and non-lexical speaker noise.

The method may further include: determining the user breathing pattern based on the speech component and the non-speech artifact using a neural network model.

The method may further include: identifying a duration and an amplitude of at least one inhalation and exhalation of the user while providing the audio input to the voice assistant device; and determining whether the user's intention may be to continue the conversation based on the duration and the amplitude.

The predefined listening time of the voice assistant device may be one of a default listening time set during manufacturing of the voice assistant device, and a dynamically set listening time different from a default listening time.

According to an aspect of the disclosure, a system for dynamically adjusting a predefined listening time of a voice assistant device includes: a receiving module configured to receive an audio input; a breath analysis module configured to analyze the audio input; a listening time adjustment module configured to adjust a predefined listening time of the voice assistant device; a memory storing at least one instruction; and at least one processor configured to execute the at least one instruction to: receive, via the receiving module, the audio input; extract, via the breath analysis module, at least one of a speech component and a non-speech artifact from the audio input; determine, via the breath analysis module, a user breathing pattern based on at least one of the speech component and the non-speech artifact; identify, via the breath analysis module, at least one attribute that impacts the user breathing pattern based on at least one non-speech component, captured from an environment and the voice assistant device; determine, via the listening time adjustment module, after detecting a pause in the audio input, whether a user's intention is to continue a conversation based on an analysis of the user breathing pattern and the at least one attribute; and dynamically adjust the predefined listening time of the voice assistant device, via the listening time adjustment module, to continue listening for voice commands in the conversation based on the user's intention is to continue the conversation.

The system may further include: a pause analysis module configured to detect the pause in the audio input, and the at least one processor may be further configured to execute the at least one instruction to: detect, via the pause analysis module, the pause of a specific time duration after receiving the audio input, and dynamically adjust the predefined listening time of the voice assistant device, via the listening time adjustment module, based on the specific time duration of the pause, to continue listening for the voice commands in the conversation after the pause.

The at least one processor may be further configured to execute the at least one instruction to: determine, via the breath analysis module, an intention-to-speak more (ISM) coefficient based on the user breathing pattern and the at least one attribute; and dynamically adjust the predefined listening time of the voice assistant device, via the listening time adjustment module, based on the ISM coefficient and a speech threshold value.

The at least one processor may be further configured to execute the at least one instruction to: suspend a requirement of receiving a hot word to continue listening for the voice commands, based on dynamically adjusting the predefined listening time of the voice assistant device.

According to an aspect of the disclosure, a non-transitory computer readable medium for storing computer readable program code or instructions which are executable by one or more processors to perform a method of dynamically adjusting a predefined listening time of a voice assistant device. The method includes: receiving an audio input; extracting at least one of a speech component and a non-speech artifact from the audio input; determining a user breathing pattern based on the at least one of the speech component and the non-speech artifact; identifying at least one attribute that impact the user breathing pattern based on at least one non-speech component, captured from an environment and the voice assistant device; determining, after detecting a pause in the audio input, whether a user's intention is to continue a conversation based on an analysis of the user breathing pattern and the at least one attribute; and dynamically adjusting the predefined listening time of the voice assistant device to continue listening for voice commands in the conversation based on a determination that the user's intention is to continue the conversation.

The method may further include: detecting the pause of a specific time duration after receiving the audio input; and dynamically adjusting the predefined listening time of the voice assistant device based on the specific time duration of the pause to continue listening for the voice commands in the conversation after the pause.

The method may further include: determining an intention-to-speak more (ISM) coefficient based on the analysis of the user breathing pattern and the at least one attribute; and dynamically adjusting the predefined listening time of the voice assistant device based on the ISM coefficient and a speech threshold value.

The method may further include: suspending a requirement of receiving a hot word to continue listening for the voice commands, based on dynamically adjusting the predefined listening time of the voice assistant device.

The method may further include: identifying a duration and an amplitude of at least one inhalation and exhalation of the user while providing the audio input to the voice assistant device; and determining whether the user's intention is to continue the conversation based on the duration and the amplitude.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 1C illustrates an example follow-up to the example interaction in FIG. 1A in the related art;

DETAILED DESCRIPTION

Figure 1A:
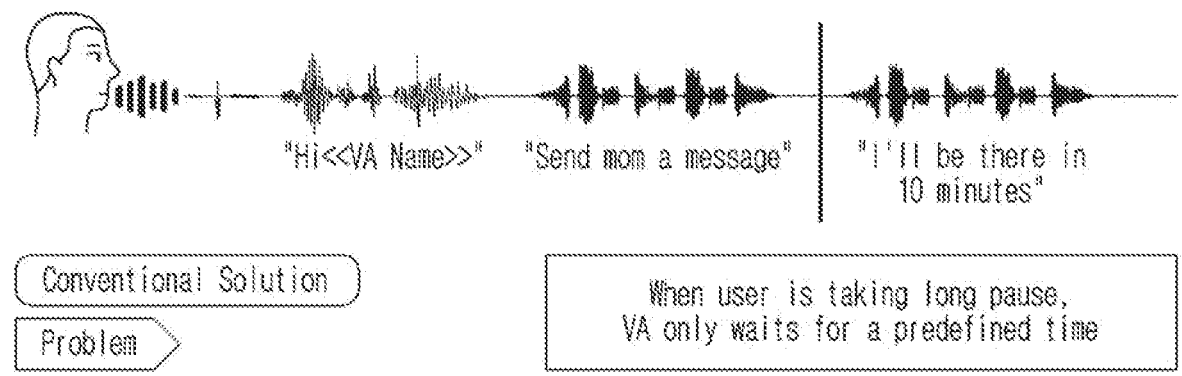
FIG. 1A illustrates an example interaction between a user and a voice assistant in the related art.

For the purpose of promoting an understanding of the principles of the disclosure, reference will now be made to the various embodiments and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are explanatory of the disclosure and are not intended to be restrictive thereof.

Further, skilled artisans will appreciate that elements in the drawings are illustrated for simplicity and may not have necessarily been drawn to scale. For example, the flowcharts illustrate the method in terms of the most prominent steps involved to help to improve understanding of aspects. Furthermore, in terms of the construction of the device, one or more components of the device may have been represented in the drawings by conventional symbols, and the drawings may show only those specific details that are pertinent to understanding the embodiments so as not to obscure the drawings with details that will be readily apparent to those of ordinary skill in the art having the benefit of the description herein.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment" and similar language throughout this specification may, but do not necessarily, all refer to the same embodiment.

The terms "comprises", "comprising", "includes", "including", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

The disclosure provides for a method and system for dynamically adjusting a predefined listening time of a voice assistant device based on an analysis of the breathing pattern of the user.

Breathing pattern during voice commands is an important aspect which predicts the intention of user to speak more. While providing commands, users first inhale and then produce the voice command while exhaling. Various embodiments of the disclosure are directed towards using the breathing pattern to identify user's intention to speak more and accordingly adjust the mic awake time.

Once the user provides commands including a hot word (e.g., "Hi «Name of Voice Assistant»") to a voice assistant device, the user's breathing pattern and non-speech artifacts from audio spectrogram or waveform are continuously analyzed to determine whether the user's intention is to speak more. Based on the user's intention to speak more, the listening time is dynamically adjusted for continuation and follow-up utterances.

FIG. 1A illustrates an example interaction between a user and a voice assistant in the related art.

Referring to FIG. 1A, the user may initially provide a voice command to a voice assistant (VA) such as "Send mom a message". To provide such a command, the user may initiate the command with a voice input comprising a hot word such as "Hi «VA Name»">". In response to receipt of such hot word-based voice input, the VA is triggered and processes a voice command which is received within a specific time duration after the hot word. Various VAs may be triggered based on different pre-configured hot words or wake-up commands, such as "Hi «VA name»">", "Hello «VA name»">", "OK «VA name»">", etc. The trigger/wake-up commands including the hot words may also be manually modified by the users. The specific duration after the hot word during which the voice command needs to be provided by the user, is pre-configured by the manufacturer during manufacturing of the VA device or system.

Referring to FIG. 1A, when user is taking long pause (may be due to thinking about message content), the VA waits for a pre-configured or predefined listening time (e.g., 600 Milliseconds) for receiving speech. If the user does not provide any command within such a pre-configured time, the VA marks end of utterance, and stops listening which results in missing the continuation of utterance.

Figure 1B:
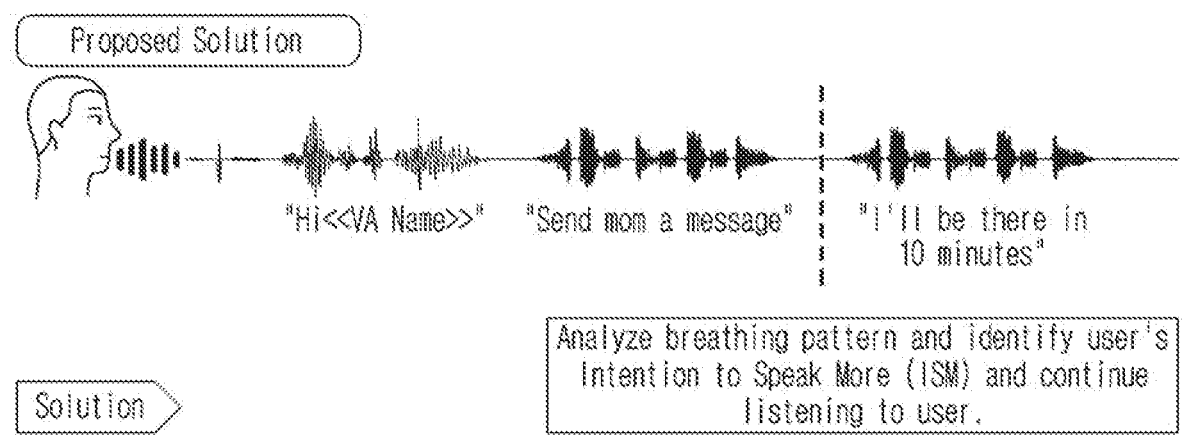
FIG. 1B illustrates an example interaction between a user and a voice assistant according to various embodiments.

FIG. 1B illustrates an example interaction between a user and a voice assistant according to various embodiments.

Referring to FIG. 1B, various embodiments of the disclosure analyze a breathing pattern of the user and identify the user's intention to speak more (ISM). Based on the user's ISM, a pre-configured or predefined listening time of the user may be modified dynamically to continue listening for continuation of utterance by the user.

FIG. 1C illustrates an example follow-up to the example interaction in FIG. 1A in the related art.

Referring to FIG. 1C, the user provides a wake-up command comprising a hot word, such as "Hi «VA name»" and subsequently provides a command such as "How is weather today?". When the user completes an utterance, the VA waits for 600 Milliseconds (static time) for speech, marks the end of utterance, and stops listening. If the user wants to provide a follow-up utterance, then he/she is required to manually re-trigger the VA by providing a wake-up command including the hot word.

Figure 1D:
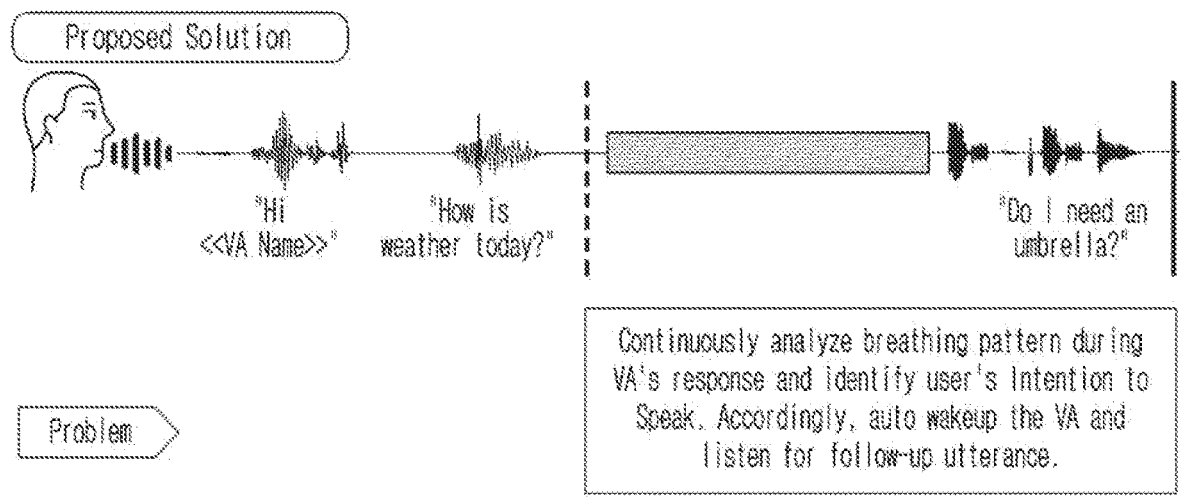
FIG. 1D illustrates an example follow-up to the example interaction in FIG. 1B according to various embodiments.

FIG. 1D illustrates an example follow-up to the example interaction in FIG. 1B according to various embodiments.

Referring to FIG. 1D, once the user provides a command such as "how is weather today?", various embodiments of the continuously analyze a breathing pattern of the user during a VA's response and identify the user's ISM. Based on the ISM, the VA will be auto-awaken to listen for follow-up utterance without any need for receiving a second wake-up command comprising hot word.

Figure 2A:
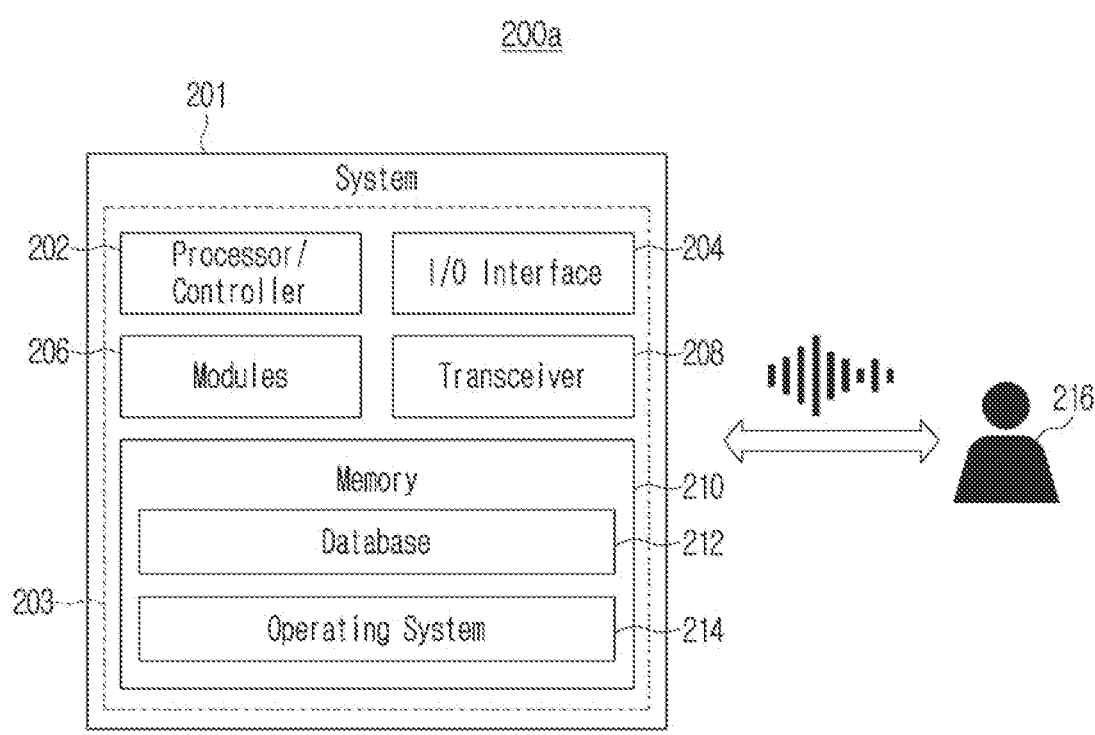
FIG. 2A illustrates a schematic block diagram of a system for dynamically adjusting a predefined listening time of a voice assistant device, according to an embodiment.

FIG. 2A illustrates a schematic block diagram 200a of a system 203 for dynamically adjusting a predefined listening time of a voice assistant device 201, according to an embodiment of the disclosure.

In one embodiment, the system 203 may be included within the voice assistant device 201. In other embodiments, the system 203 may be configured to operate as a standalone device or system. In yet other embodiments, the system 203 may be included within a mobile device which includes a voice assistant system (such as 201). The system 203 may be configured as a mobile software application or as an operating system function of the mobile device. Examples of a mobile device may include, but not limited to, a mobile phone or any other electronic device providing voice input capability required by a voice assistant. Examples of voice assistant device 201 may include, but not limited to, a voice assistant, a smart watch, a laptop computer, a desktop computer, a Personal Computer (PC), a notebook, a tablet, a mobile phone, and e-book readers or any other smart device having a voice input capability required by a voice assistant.

In various embodiments of the disclosure, the system 203 within the voice assistant device 201 may be configured to dynamically adjust a predefined listening time of a voice assistant device. The system 203 may further include at least one processor/controller 202, an I/O interface 204, one or more modules 206, transceiver 208, and a memory 210.

In some embodiments, the memory 210 may be communicatively coupled to the at least one processor/controller 202. The memory 210 may be configured to store data, and instructions executable by the at least one processor/controller 202. In some embodiments, the one or more modules 206 may be included within the memory 210. The memory may further include a database 212 to store data. The one or more modules 206 may include a set of instructions that may be executed by the at least one processor/controller 202 to cause the system 203 to perform any one or more of the methods disclosed herein. The one or more modules 206 may be configured to perform the steps or operations of the disclosure using the data stored in the database 212, and to dynamically adjust a predefined listening time of a voice assistant device. In an embodiment, each of the one or more modules 206 may be a hardware unit which may be outside the memory 210. Further, the memory 210 may include an operating system 214 for performing one or more tasks of the system 203 and/or voice assistant device 201, as performed by a generic operating system in the communications domain. The transceiver 208 may be capable of receiving and transmitting signals to and from the voice assistant device 201. The I/O interface 204 may include a speaker and/or a microphone to receive voice commands and provide a voice output to the user 216. Further, the I/O interface 204 may provide a display function and one or more physical buttons on the voice assistant device 201 to input/output various functions of the voice assistant device 201. For the sake of brevity, the architecture and standard operations of operating system 214, memory 210, database 212, at least one processor/controller 202, transceiver 208, and I/O interface 204 are not discussed in detail. In one embodiment, the database 212 may be configured to store the information as required by the one or more modules 206 and at least one processor/controller 202 to perform one or more functions to dynamically adjust a predefined listening time of the voice assistant device 201.

The I/O interface 204 may be configured to receive the voice inputs and non-speech sounds from the users within a surrounding environment and also configured to handle an audio or a video call which is either initiated on or is transferred from a connected mobile device. The voice commands may be handled by the I/O interface 204 in conjunction with a speaker, which may be configured to provide the voice output to the users (e.g., 216).

In one embodiment, the memory 210 may communicate via a bus within the system 203. The memory 210 may include, but not limited to, a non-transitory computer-readable storage media, such as various types of volatile and non-volatile storage media including, but not limited to, random access memory, read-only memory, programmable read-only memory, electrically programmable read-only memory, electrically erasable read-only memory, flash memory, magnetic tape or disk, optical media and the like. In one example, the memory 210 may include a cache or random-access memory for the at least one processor/controller 202. In alternative examples, the memory 210 is separate from the at least one processor/controller 202, such as a cache memory of a processor, the system memory, or other memory. The memory 210 may be an external storage device or database for storing data. The memory 210 may be operable to store instructions executable by the at least one processor/controller 202. The functions, acts or tasks illustrated in the figures or described may be performed by the at least one processor/controller 202 executing the instructions stored in the memory 210. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing, and the like.

Further, the disclosure contemplates a computer-readable medium that includes instructions or receives and executes instructions responsive to a propagated signal, so that a device (e.g., voice assistant device 201) connected to a network may communicate voice, video, audio, images, or any other data over a network. Further, the instructions may be transmitted or received over the network via a communication port or interface or using a bus. The communication port or interface may be a part of the at least one processor/controller 202 or may be a separate component. The communication port may be created in software or may be a physical connection in hardware. The communication port may be configured to connect with a network, external media, the display, or any other components in system, or combinations thereof. The connection with the network may be a physical connection, such as a wired Ethernet connection or may be established wirelessly. Likewise, the additional connections with other components of the system 203 may be physical or may be established wirelessly. The network may alternatively be directly connected to the bus.

In one embodiment, the at least one processor/controller 202 may include at least one data processor for executing processes in a Virtual Storage Area Network. The at least one processor/controller 202 may include specialized processing units such as, integrated system (bus) controllers, memory management control units, floating point units, graphics processing units, digital signal processing units, etc. In one embodiment, the at least one processor/controller 202 may include a central processing unit (CPU), a graphics processing unit (GPU), or both. The at least one processor/controller 202 may be one or more general processors, digital signal processors, application-specific integrated circuits, field-programmable gate arrays, servers, networks, digital circuits, analog circuits, combinations thereof, or other now known or later developed devices for analyzing and processing data. The at least one processor/controller 202 may implement a software program, such as code generated manually (i.e., programmed).

The at least one processor/controller 202 may be in communication with one or more input/output (I/O) devices via the I/O interface 204. The I/O interface 204 may employ communication code-division multiple access (CDMA), high-speed packet access (HSPA+), global system for mobile communications (GSM), long-term evolution (LTE), WiMax, or the like, etc.

Using the I/O interface 204, the voice assistant device 201 may communicate with one or more I/O devices. For example, the input device may be an antenna, microphone, touch screen, touchpad, storage device, transceiver, video device/source, etc. The output devices may be a printer, fax machine, video display (e.g., cathode ray tube (CRT), liquid crystal display (LCD), light-emitting diode (LED), plasma, Plasma Display Panel (PDP), organic light-emitting diode display (OLED) or the like), audio speaker, etc.

The at least one processor/controller 202 may be disposed in communication with a communication network via a network interface. The network interface may be the I/O interface 204. The network interface may connect to a communication network. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network may include, without limitation, a direct interconnection, local area network (LAN), wide area network (WAN), wireless network (e.g., using Wireless Application Protocol), the Internet, etc. Using the network interface and the communication network, the voice assistant device 201 may communicate with other devices. The network interface may employ connection protocols including, but not limited to, direct connect, Ethernet (e.g., twisted pair 10/100/1000 Base T), transmission control protocol/internet protocol (TCP/IP), token ring, IEEE 802.11a/b/g/n/x, etc.

The at least one processor/controller 202 may identify voice or non-voice commands from the received speech sounds and non-speech sounds. A trained classifier model or various speech extraction techniques may be implemented to extract or identify the voice commands and the senders of the commands, such as user 216.

Figure 2B:
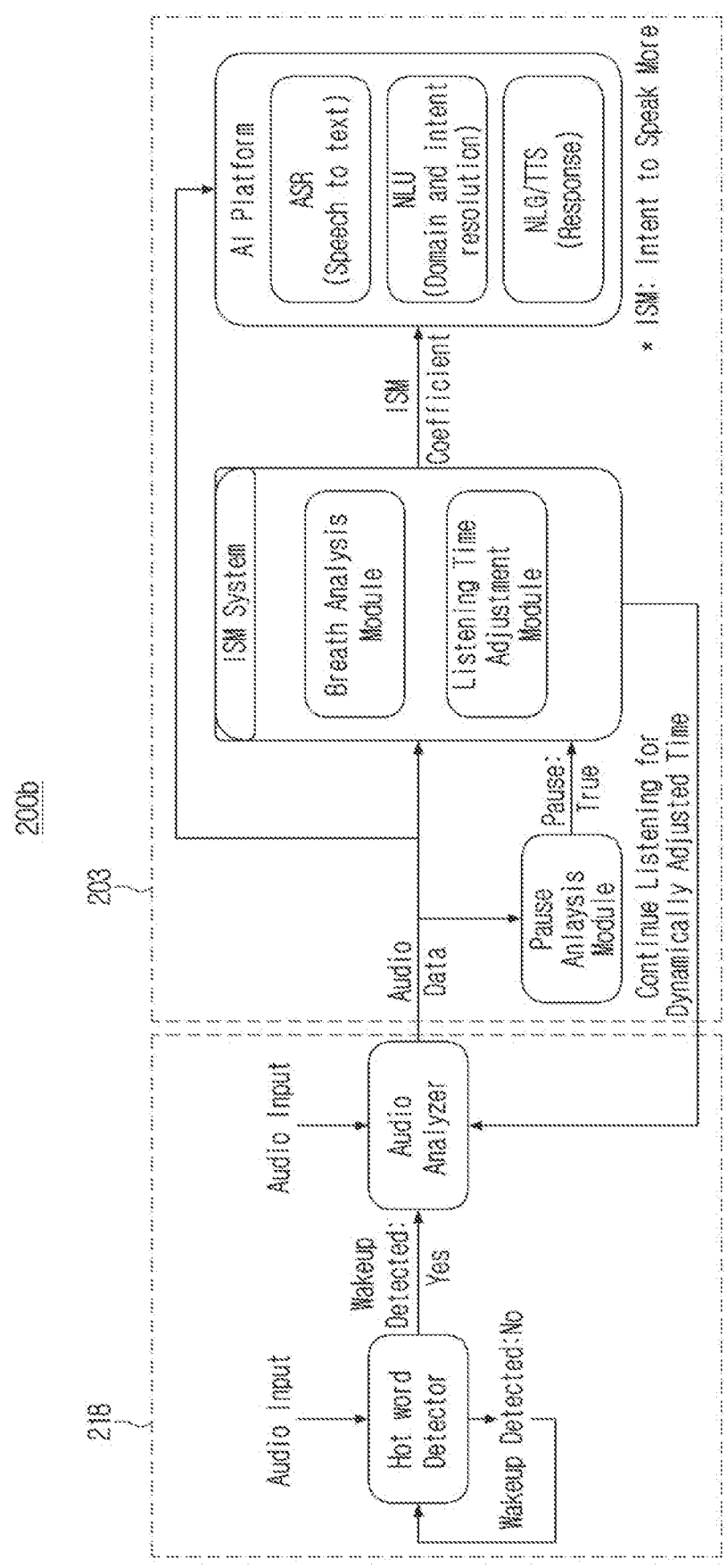
FIG. 2B illustrates another schematic block diagram of a system for dynamically adjusting a predefined listening time of the voice assistant device, according to an embodiment.

FIG. 2B illustrates another schematic block diagram 200b of a system 203 for dynamically adjusting a predefined listening time of a voice assistant device, according to an embodiment. As shown in FIG. 2B, the system 203 may receive a sequential flow of various inputs from a receiving module 218. The receiving module 218 may include a hot word detector configured to detect and analyze a hot word or wake-up input. Further, an audio analyzer of the receiving module 218 may be configured to process and execute an audio input or command received from the user to perform the desired function.

Once the audio input or command is executed to perform the desired function, the pause analysis module may be configured to detect a pause in the speech. Upon detection of a pause, an intention to speak more (ISM) system comprising a breath analysis module and a listening time adjustment module may be configured to analyze user's breath to dynamically adjust the pre-configured listening time in order to continue listening for user's utterance or follow-up commands without requiring a wake-up/trigger command comprising any hot word. The system 203 may further include an artificial intelligence (AI) platform including an automatic speech recognition (ASR), a natural language understanding (NLU), and a natural language generation (NLG)/text-to-speech TTS. In one embodiment, the AI platform may be configured to process the audio inputs or commands, and further configured to output audio. The ASR may be configured to use the Machine Learning or Artificial Intelligence (AI) technology to process human speech into readable text. As widely known, the NLU is a branch of natural language processing (NLP), which helps computers understand and interpret human language by breaking down the elemental pieces of speech. While speech recognition captures spoken language in real-time, transcribes it, and returns text, NLU goes beyond recognition to determine a user's intent. The NLG is a branch of artificial intelligence (AI) that generates language as an output on the basis of data as input. Further, the TTS is a type of assistive technology that reads digital text aloud. It's sometimes called "read aloud" technology. For the sake of brevity, the detailed functioning of the ASR, NLU, and NLG/TTS are not discussed in detail here, as the generic functions are widely known in the art. The functions of each of the other modules are discussed in conjunction with FIG. 3 hereinafter.

Figure 3:
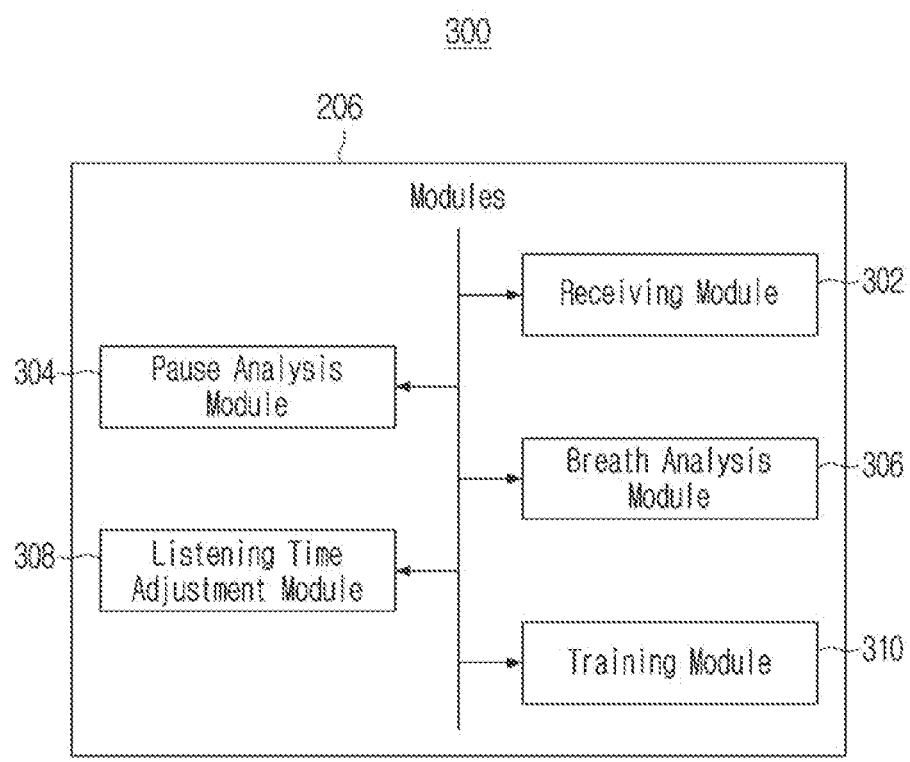
FIG. 3 illustrates a schematic block diagram of modules of the system for dynamically adjusting a predefined listening time of the voice assistant device, according to an embodiment.

FIG. 3 illustrates a schematic block diagram 300 of modules 206 of the system 203 for dynamically adjusting a predefined listening time of the voice assistant device 201, according to an embodiment of the disclosure. In one embodiment, the modules 206 may include a receiving module 302, a pause analysis module 304, a breath analysis module 306, a listening time adjustment module 308, and a training module 310.

In one embodiment, the receiving module 302 may be configured to receive an audio input. The receiving module 302 may be similar to the receiving module 218. In one embodiment, the audio input may include a hot word or wake-up command indicating initiation of a conversation. Examples of hot words may include, but not limited to, "Hi «VA name»", "Hello «VA name»", and "OK «VA name»". The wake-up commands including the hot words may also be manually modified/configured by the users in the voice assistant devices. In some embodiments, the receiving module 302 may be configured to filter the noise from the audio input and provide a noise-free output to the pause analysis module 304.

Further, the receiving module 302 may be configured to receive the speech or voice input received after the hot-word detection from the user. The voice input may be processed and the command associated with the voice input may be executed. For the sake of brevity, the execution of voice commands at the system 203 or the voice assistant device 201 is not discussed in detail here. In some embodiments, a processing module may be provided to execute the voice commands.

In one embodiment, the pause analysis module 304 may be configured to detect a pause of a specific time duration after receiving the audio input. The pause analysis module may be configured to receive the audio input without noise component from the receiving module 302. In some embodiments, the speech or voice input may be analyzed by the breath analysis module 306 without or before detection of any pause signal. In one embodiment, the pause duration may be specific to each user. In particular, the pause duration detection may be based on identification of a user. Further, in an embodiment, the pause may correspond to a pause between two words of the language spoken by the user. In another embodiment, the pause may correspond to a pause between two sentences of the spoken language. The identification of words and sentences of the spoken language is not discussed in detail here for the sake of brevity.

In one embodiment, the breath analysis module 306 may be configured to extract one or more of a speech component and a non-speech artifact from the audio input which may be used to determine breathing patterns and continuation of utterances for the conversation (follow-up utterances). In an embodiment, the captured speech signal may be evaluated for estimating the breath signal in an asynchronous manner. Further, the user may be identified based on the detected breathing pattern or one or more other user specific characteristics/parameters. In an embodiment, the user's breathing pattern may be matched to one or more pre-stored user profiles. The pre-stored user's profile may include, but not limited to, voice input, breathing pattern, device profile and user's age. In other embodiments, the user's profile may be determined based on voice input detected by the receiving module 302. In one embodiment, the speech component comprises one or more of phonemes and graphemes. The non-speech artifact comprises one or more of breathing sounds, non-lexical speaker noise, and background noise.

Further, the breath analysis module 306 may be configured to determine a user breathing pattern based on the one or more of the speech component and the non-speech artifact. In one embodiment, the user breathing pattern is determined using one of an audio spectrogram and a waveform analysis. Further, the user breathing pattern may be determined based on the at least one speech component and the at least one non-speech artifact using a neural network model. In one embodiment, the estimation of breath signals or patterns may be based on a regression model. The breathing pattern may be determined based on an input speech feature vector corresponding to the voice input, and the approach used may be speech feature vector-to-signal regression. Further, the breathing pattern of the user may be output as a breath vector for further processing, as discussed herein. In one embodiment, the user breathing pattern identification may include identifying a duration and an amplitude of at least one inhalation and exhalation of the user while providing the audio input to the voice assistant device.

In one embodiment, the breath signal or pattern may be determined based on labeled training data stored in a neural network model. Further, speech Log Mel Filters may be used to determine an output feature vector corresponding to breath signal or pattern. An exemplary set of speech samples with associated breath signal vector is illustrated in Table 1 below:

TABLE 1

| Sppech Sample | Breath Signal Vector (Sensor Data) |
|---|---|
| Speech Wave 1 | [0.12, 0.34, 0.5, 0.25, . . . , 0.68] |
| Speech Wave 2 | [0.10, 0.24, 0.48, 0.20, . . . , 0.3] |
| . . . | . . . |
| Speech Wave n | [0.09, 0.20, 0.30, 0.15, . . . , 0.66] |

A corresponding feature vector associated with the user's breathing pattern or signal is derived as shown in Table 2 below. A feed forward neural network with back propagation may be used to determine breath signal feature vectors.

TABLE 2

| Speech Log Mel Filters (186 × 13) | Breath Signal Vector |
|---|---|
| [17.72300, −5.91531, −5.75788, . . . 8.81263] | [0.12, 0.34, 0.5, 0.25, . . . , 0.68] |
| [19.1679, −4.93061, −8.4695 . . . , 12.53456] | [0.10, 0.24, 0.48, 0.20, . . . , 0.3] |
| . . . | . . . |
| [19.92615, −9.81114, −20.52169 . . . 9.1371] | [0.09, 0.20, 0.30, 0.15, . . . , 0.66] |

Additionally, the breath analysis module 306 may be configured to identify one or more attributes that impact the user breathing pattern based on at least one non-speech component, captured from the surrounding environment and the voice assistant device. Such non-speech components are captured to identify parameters/components that may impact the breathing pattern of users for the continuation of conversation (follow-up utterances). In one embodiment, the at least one non-speech component comprises one or more of environment noise, microphone channel noise, and non-speech artifacts (e.g., non-lexical speaker noise such as hum, hmm, aaa, bb, etc. along with breathing sounds). Further, the one or more attributes comprise one or more of environmental parameters, user data (e.g., gender), and voice assistant device data (e.g., device GPS coordinates). In one embodiment, the breath analysis module 306 may be configured to use a neural net regression model for identifying environmental parameters.

Further, after detecting a pause in the audio input, the breath analysis module 306 may determine whether a user's intention is to continue the conversation based on an analysis of the user breathing pattern and the one or more attributes. In one embodiment, the determining comprises determining an intention-to-speak more (ISM) coefficient based on the analysis of the user breathing pattern and the one or more attributes. The user's profile may also be considered while determining the ISM coefficient, and hence, the ISM coefficient may be specific to each user. In one embodiment, the ISM coefficient may have values from −1 to 0 indicating that the user does not have an intention to speak more, the values more than 0 to 1 may indicate that the user has an intention to speak more which may require an adjustment to the current listening time of the voice assistant device. In another embodiment, it may be determined whether the ISM coefficient is monotonically increasing or decreasing. In case of monotonic decrease in the ISM coefficient over time, it may be determined/concluded that the user's tendency to speak is declining. On the other hand, in case of monotonic increase in the ISM coefficient over time, it may be determined/concluded that the user's tendency to speak is advancing. In one embodiment, the determination of whether the user's intention is to continue the conversation is based on the identified duration and the amplitude of the at least one inhalation and exhalation of the user while providing the input to the voice assistant device. More specifically, the determination of whether user's intention is to speak more is based on the user's breathing pattern, environmental parameters, and user device data to dynamically adjust the voice assistant's mic listening (wake-up) time.

In one embodiment, the breath signal ISM coefficient values may be determined based on labeled training data stored in a neural network model. An exemplary set of breath signal vectors and corresponding ISM coefficient values is illustrated in Table 3 below:

TABLE 3

| Breath Signal Vector | External Factor | ISM Coefficient |
|---|---|---|
| [0.12, 0.34, 0.5, 0.25, . . . , 0.68] | Environment, User Profile, . . . | [0.68] |
| [0.10, 0.24, 0.48, 0.20, . . . , 0.3] | Environment, User Profile | [−0.45] |
| . . . | . . . | . . . |
| [0.09, 0.20, 0.30, 0.15, . . . 0.66] | Environment, User Profile | [0.58] |

An exemplary feature vector output based on the labeled data store in neural network model may be derived as indicated in Table 4 below. A feed forward neural network with back propagation may be used to determine feature vectors associated with ISM coefficients.

TABLE 4

| Parameter | Time Range (Second) |
|---|---|
| Speech exhalation duration | Several seconds as per Speech flow |
| Normal inhalation duration | 1 <= T <= 1.5 |
| Normal exhalation duration | 1.5 <= T <= 2.0 |

TABLE 4-continued

| Parameter | Time Range (Second) |
|---|---|
| Normal inhalation pause duration | 1.0 <= T <= 2.0 |
| Normal exhalation pause duration | 1.0 <= T <= 2.0 |
| Quick exhalation duration | 0 < T < 1.5 |
| Quick inhalation duration | 0 < T < 1.0 |
| Breath hold duration | T > 2.0 |

In one embodiment, the listening time adjustment module 308 may be configured to dynamically adjust the predefined listening time of the voice assistant device to continue listening for voice commands in the conversation based on a determination that the user's intention is to continue the conversation. The predefined listening time of the voice assistant device is one of a default listening time set during manufacturing of the voice assistant device, and a dynamically set listening time different from the default listening time. To dynamically adjust the predefined listening time, the listening time adjustment module 308 may be configured to determine a listening duration based on the estimated ISM coefficient when the pause analysis is detected by the pause analysis module 304. In an embodiment, if the current speech threshold is 600 ms, then the listening time may be adjusted from 0 to 2*speech threshold, i.e., from 0 to 1200 ms. In another embodiment, the adjusted listening time may be derived based on the following formula:

Adjusted Listening Time=Speech Threshold*(1+ISM Coefficient)

In some embodiments, the listening time may only be adjusted based on a comparison with a pause duration. For example, the listening time may be adjusted if the pause duration is less than 180 seconds. If the pause duration is more than 180 seconds, than the voice assistant may be configured to stop listening to user voice inputs.

In one embodiment, the dynamically adjustment of the predefined listening time of the voice assistant device is based on the specific time duration of the pause to continue listening for voice commands in the conversation after the pause. In another embodiment, the dynamically adjusting predefined listening time of the voice assistant device is based on the ISM coefficient and a speech threshold value. Further, in some embodiments, the voice assistant device may be configured to adjust the predefined listening time for listening to user voice inputs till detection of a subsequent pause.

More specifically, in one embodiment, the listening time adjustment module 308 may be configured to eliminate a need of repeatedly waking-up the voice assistant device by suspending a requirement of receiving the hot word to continue listening for the voice commands.

In one embodiment, the training module 310 may be configured to train a machine learning (ML) or neural network model used for the listening time adjustment module 308 to modulate/adjust the listening time based on ISM coefficient. In one embodiment, the trained neural network model provides ISM coefficient and the adjusted listening time may be determined as speech threshold*(1+ISM coefficient). The speech threshold may be a predefined value (e.g., defined during manufacturing of VA, or modified during its operation) for the VA considering different age groups of users and device environments around the VA, at which the VA provides an optimal recognition performance without pausing it and abruptly leading to speech halt.

Figure 4:
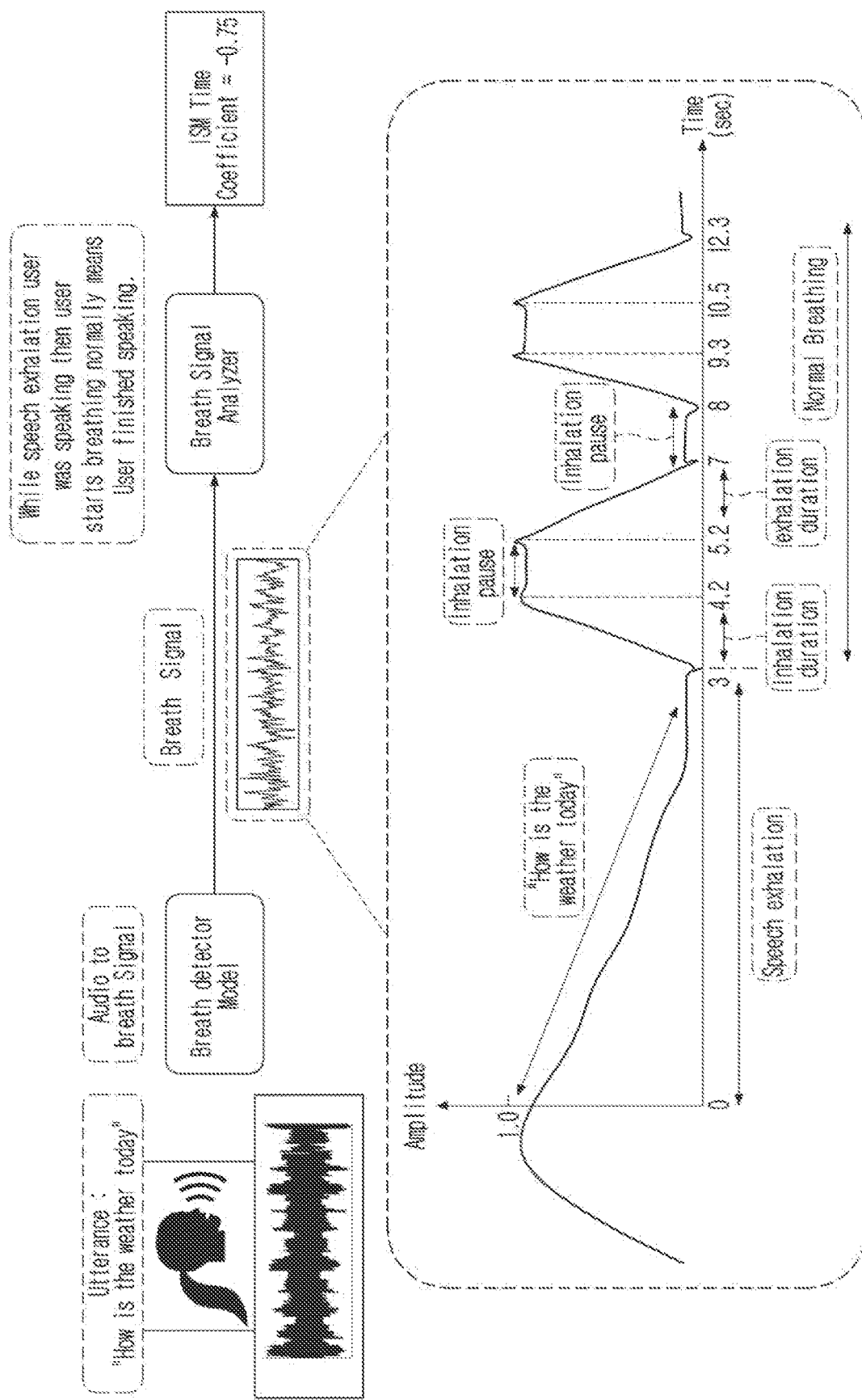
FIG. 4 illustrates an exemplary process of determining user's intention to speak more based on user's inhalation and exhalation breathing pattern while the user is speaking to a voice assistant, according to one embodiment.

FIG. 4 illustrates an exemplary process of determining user's intention to speak more based on user's inhalation and exhalation breathing pattern while the user is speaking to a voice assistant, according to one embodiment of the disclosure. Referring to FIG. 4, the breath detector model and breath signal analyzer may be a part of breath analysis module 306, as discussed previously. The breath detector model and breath signal analyzer may be configured to determine an ISM coefficient based on inhalation and exhalations in the user's breathing pattern, and to adjust the listening time of the voice assistant device.

The user's inhalation and exhalations may be analyzed during his/her utterances or commands provided to the voice assistant device. For example, the user may provide a command "how is the weather today" during exhalation phase of his/her breathing pattern. Such exhalation or command may take a duration of 3 seconds. An amplitude vs time graph is depicted to highlight the analysis performed by the breath analysis module 306.

After the exhalation and the first utterance, a pause is detected and breath analysis is performed. The breath analysis module 306 may analyze the breathing pattern in response to the aforementioned first utterance. The breathing pattern may include a duration of inhalation, an inhalation pause, an exhalation duration, and an exhalation pause. In one embodiment, the breath analysis module 306 may compare the breathing pattern of the specific user with a pre-stored breathing pattern which may be captured over time by the system. Based on the comparison, if it is detected that the user's current breathing pattern is similar to the normal or pre-stored breathing pattern of the user, then the breath analysis module 306 may conclude that the user is breathing normally. In operation, an ISM coefficient may be derived based on the captured various parameters such as speech, non-speech components, environmental parameters, and breathing sounds, as discussed previously. The ISM coefficient may be derived based on a machine learning or neural network model stored at the system 203. In this scenario, the ISM coefficient may correspond to −0.75 indicating that the user is breathing normally, and hence, the user does not desire to provide any continuation or follow-up utterance. Thus, no dynamic adjustment to the predefined listening time of the voice assistant device may be required.

Figure 5:
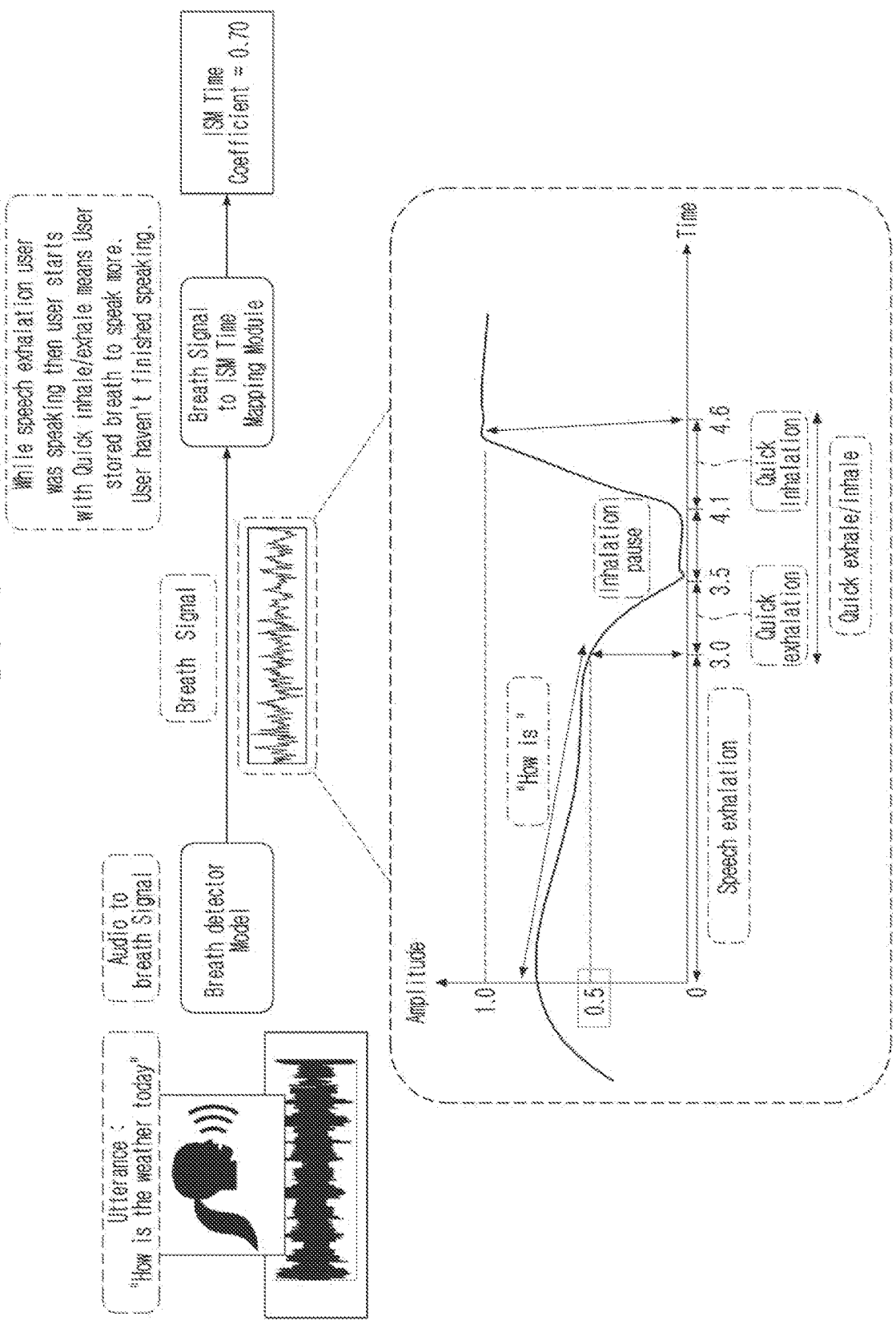
FIG. 5 illustrates an exemplary process of determining user's intention to speak more based on user's quick exhalation or inhalation while the user is speaking to a voice assistant, according to one embodiment.

FIG. 5 illustrates an exemplary process of determining user's intention to speak more based on user's quick exhalation or inhalation while the user is speaking to a voice assistant, according to one embodiment of the disclosure. Referring to FIG. 5, the breath analysis module 306 may comprise a breath detector model and a breath signal to ISM coefficient mapping module to perform the functions of breath detection and ISM coefficient determination, respectively, as discussed previously. For the sake of brevity, these are not discussed in detail here again.

Referring to FIG. 5, while the user is uttering "how is the weather today", the breath analysis module 306 may be configured to analyze breathing pattern of the user comprising cycles of inhalation and exhalations. It may be analyzed that the user uttered "how is" during speech exhalation phase of 0-3 seconds. Further, after the initial utterance of "how is", a successive sequence of quick exhalation, an inhalation pause, and a quick inhalation phase may be detected. The term "quick" specifies that the duration of inhalation and exhalation phases in the breathing pattern of the user are relatively faster than the normal breathing pattern pre-stored for the specific user, under a specific set of environmental conditions (indicated by one or more attributes related to environment). Since the user's breathing pattern indicates quick inhalation/exhalation after the exhalation speech utterance of "how is", the breath analysis module 306 may determine user is trying to store breath to speak more, thereby indicating that the user has not finished speaking yet. In operation, the breath signal to ISM time mapping module of the breath analysis module 306 may be configured to determine the ISM as 0.70, indicating user's intention to speak more. Thus, according to various embodiments, the voice assistant device may eliminate the requirement of wake-up or trigger word to receive user utterance as a part of continued conversation or command. The elimination of the requirement may be performed for an adjusted amount of time.

Figure 6:
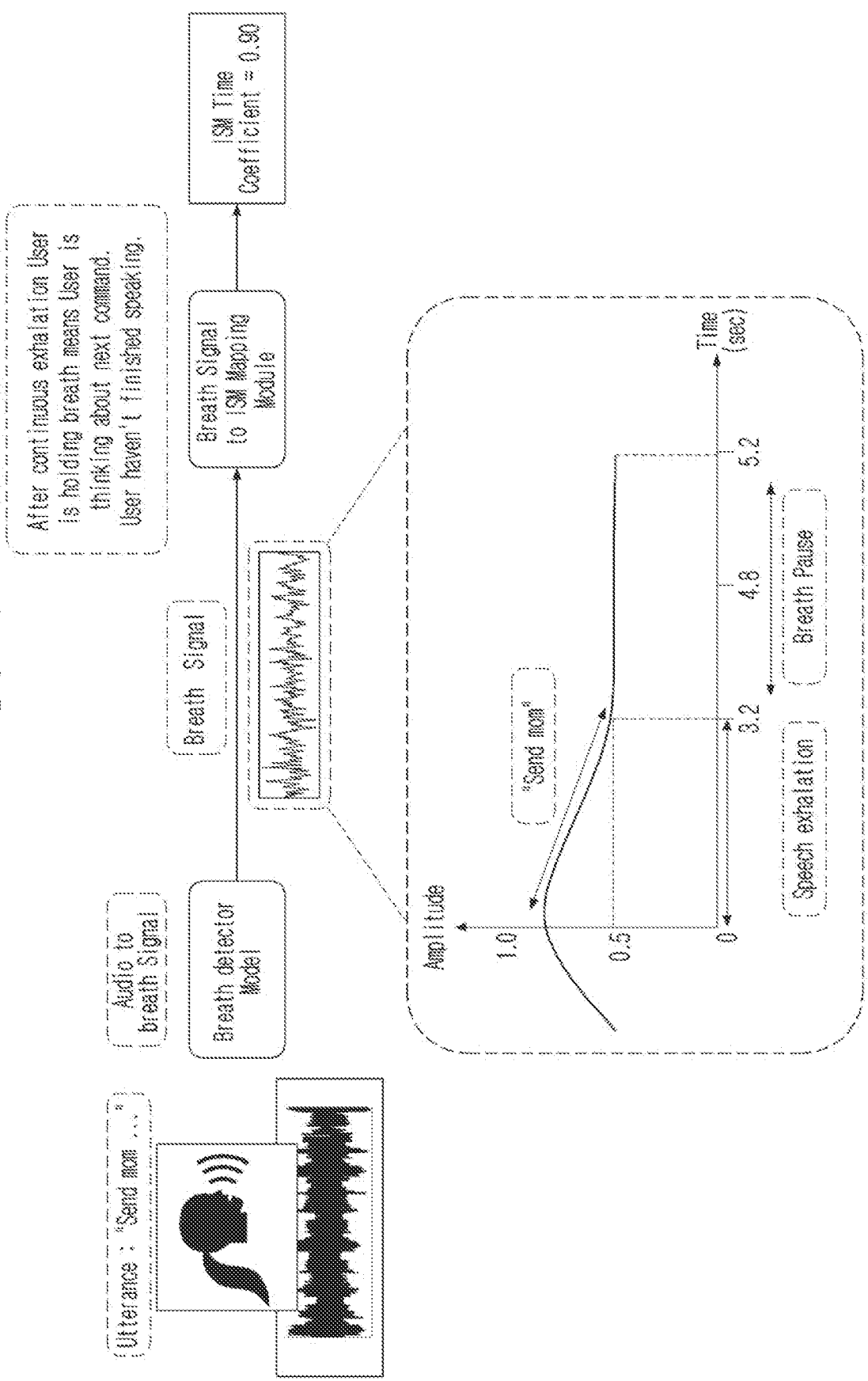
FIG. 6 illustrates an exemplary process of determining user's intention to speak more based on user's breath hold while the user is speaking to a voice assistant, according to one embodiment.

FIG. 6 illustrates an exemplary process of determining user's intention to speak more based on user's breath hold while the user is speaking to a voice assistant, according to one embodiment of the disclosure. Referring to FIG. 6, a breath pause may be detected after an initial utterance of "send mom". For example, while the initial utterance may be detected from 0-3.2 seconds, the breath pause may be detected from 3.2 to 5.2 seconds. Based on detection and analysis of the breath pause by the breath analysis module 306, an ISM coefficient may be determined as 0.90. Based on the value of ISM coefficient, it may be concluded or determined that after continuous exhalation, the user is holding breath implying that the user is thinking about next command, and hence, the user has not finished speaking yet. Thus, according to various embodiments, the voice assistant device 201 may subsequently eliminate the requirement of wake-up or trigger word to receive user utterance as a part of continued conversation or command.

Figure 7:
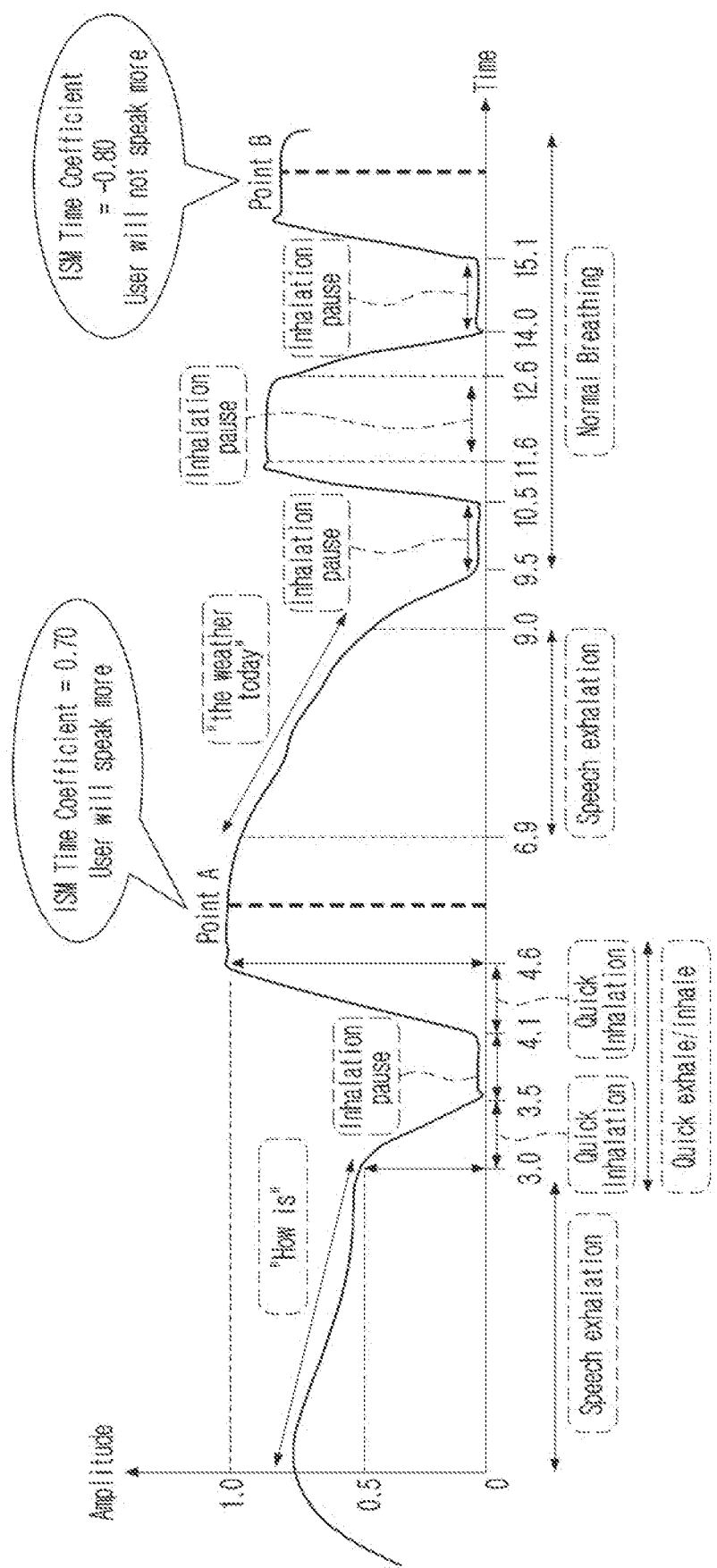
FIG. 7 illustrates an exemplary process of determining user's intention to speak more during a continuation utterance based on a combination of different breathing patterns of the user while the user is speaking to a voice assistant, according to one embodiment.

FIG. 7 illustrates an exemplary process of determining user's intention to speak more during a continuation utterance based on a combination of different breathing patterns of the user while the user is speaking to a voice assistant, according to one embodiment of the disclosure.

Referring to FIG. 7, the various scenarios explained in FIGS. 5 and 6 may be detected simultaneously, and a combined ISM coefficient may be derived. For example, during speech exhalation, the user speaks "How is" and then performs quick exhale and inhale followed by a breath hold. At "Point A" the ISM Coefficient value may be 0.70, which is >0 so the mic will continue listening for increased adjusted time. Again, during speech exhalation, the user speaks "the weather today". After some time, user starts normal breathing. At "Point B", ISM value may be –0.80, which is <0. Hence, the user won't speak more, and mic will stop listening after decreased adjusted time. Thus, in some embodiments, the listening time may also be decreased based on an analysis of the breathing pattern of user.

Figure 8:
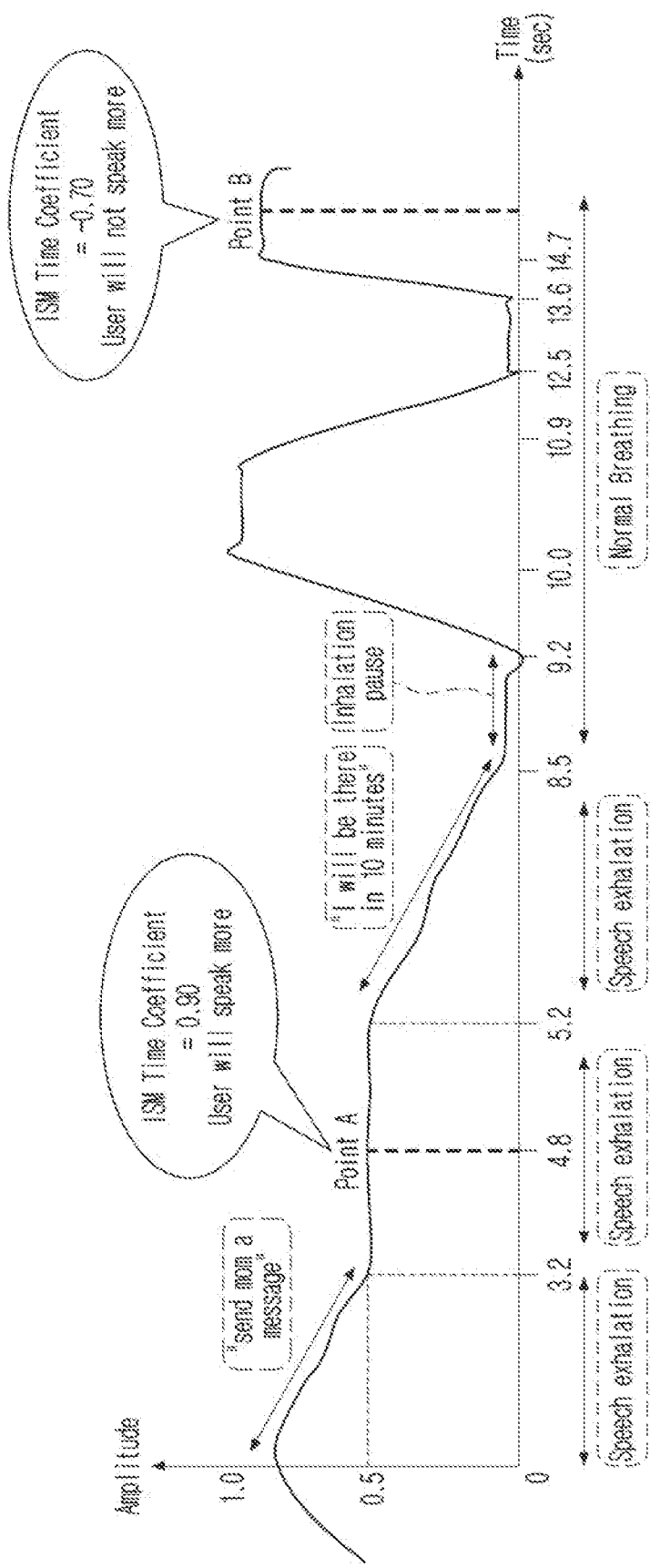
FIG. 8 illustrates an exemplary process of determining user's intention to speak more during a follow-up utterance based on a combination of different breathing patterns of the user while the user is speaking to a voice assistant, according to one embodiment.

FIG. 8 illustrates an exemplary process of determining user's intention to speak more during a follow-up utterance based on a combination of different breathing patterns of the user while the user is speaking to a voice assistant, according to one embodiment of the disclosure.

Referring to FIG. 8, during speech exhalation, the user may speak "Send mom a message" then performs breath hold which means he will speak more. At "Point A", the ISM Coefficient value may be 0.90, which is >0. Accordingly, the mic will continue listening for an increased adjusted time. Again, during speech exhalation, the user speaks follow-up utterance "I will be there in 10 minutes". Then, the user may perform normal breathing implying that the user finished speaking. At "Point B", the ISM value may be –0.70 which is <0 so the user won't speak more, and the mic will stop listening after decreased adjusted time.

Figure 9:
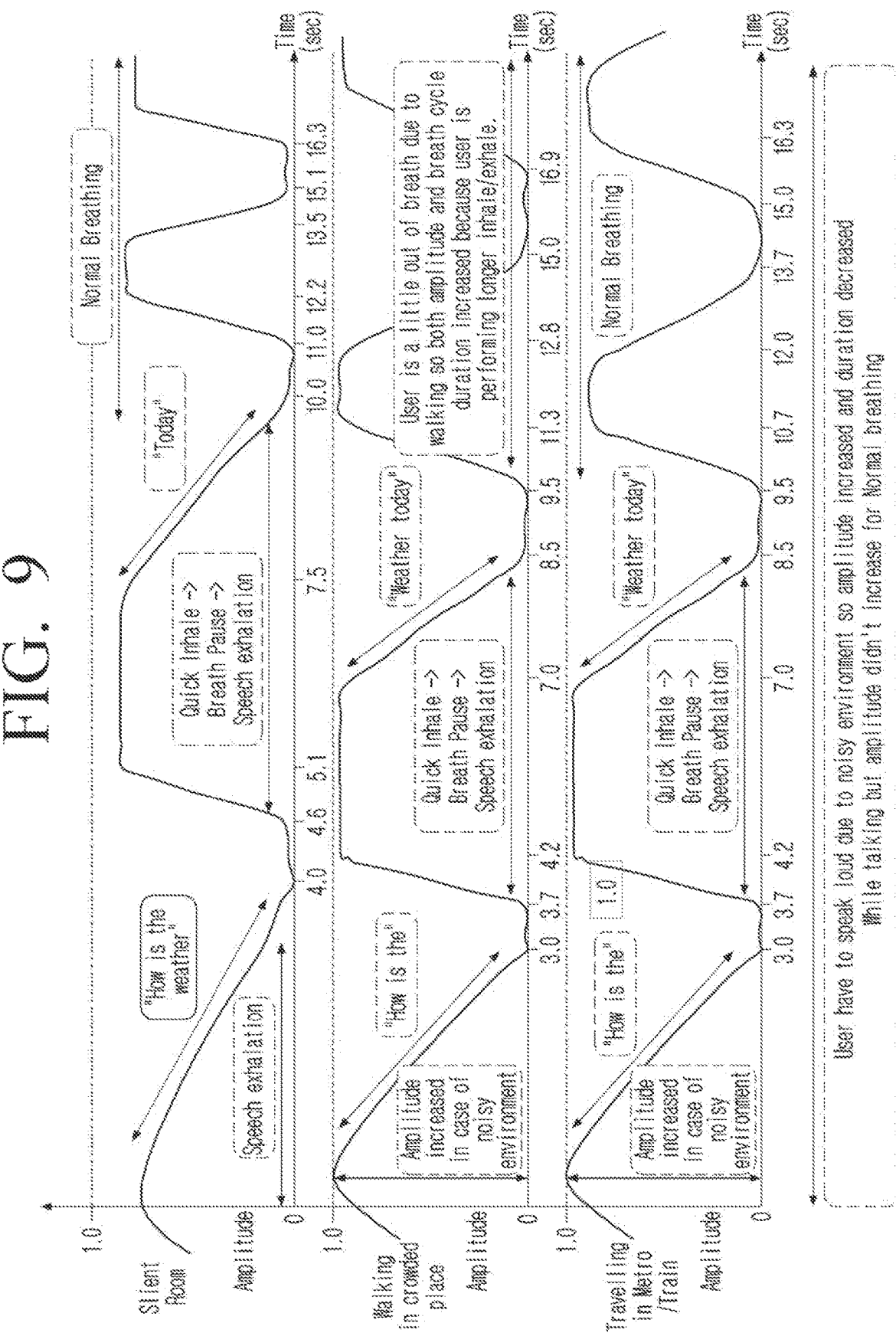
FIG. 9 illustrates various exemplary scenarios of user's breathing patterns in different surroundings while the user is speaking to a voice assistant, according to one embodiment.

FIG. 9 illustrates various exemplary scenarios of user's breathing patterns in different surroundings while the user is speaking to a voice assistant, according to one embodiment of the disclosure. Various embodiments of the disclosure may be capable of understanding the distinction between various environmental scenarios. FIG. 9 illustrates three different environmental scenarios detected based on a user's non-speech components and/or attributes associated with environmental parameters. The various scenarios detected for the user may include a silent room, walking in crowded places, and travelling in metro/bus. Various embodiments of the disclosure may be capable of analyzing the user's environment based on breathing pattern and environmental attributes captured from an environment of the user. The breath analysis module 306 may be configured to adjust the model to derive ISM value to correctly identify the user's intention in order to adjust the predefined listening time of the voice assistant device.

Figure 10:
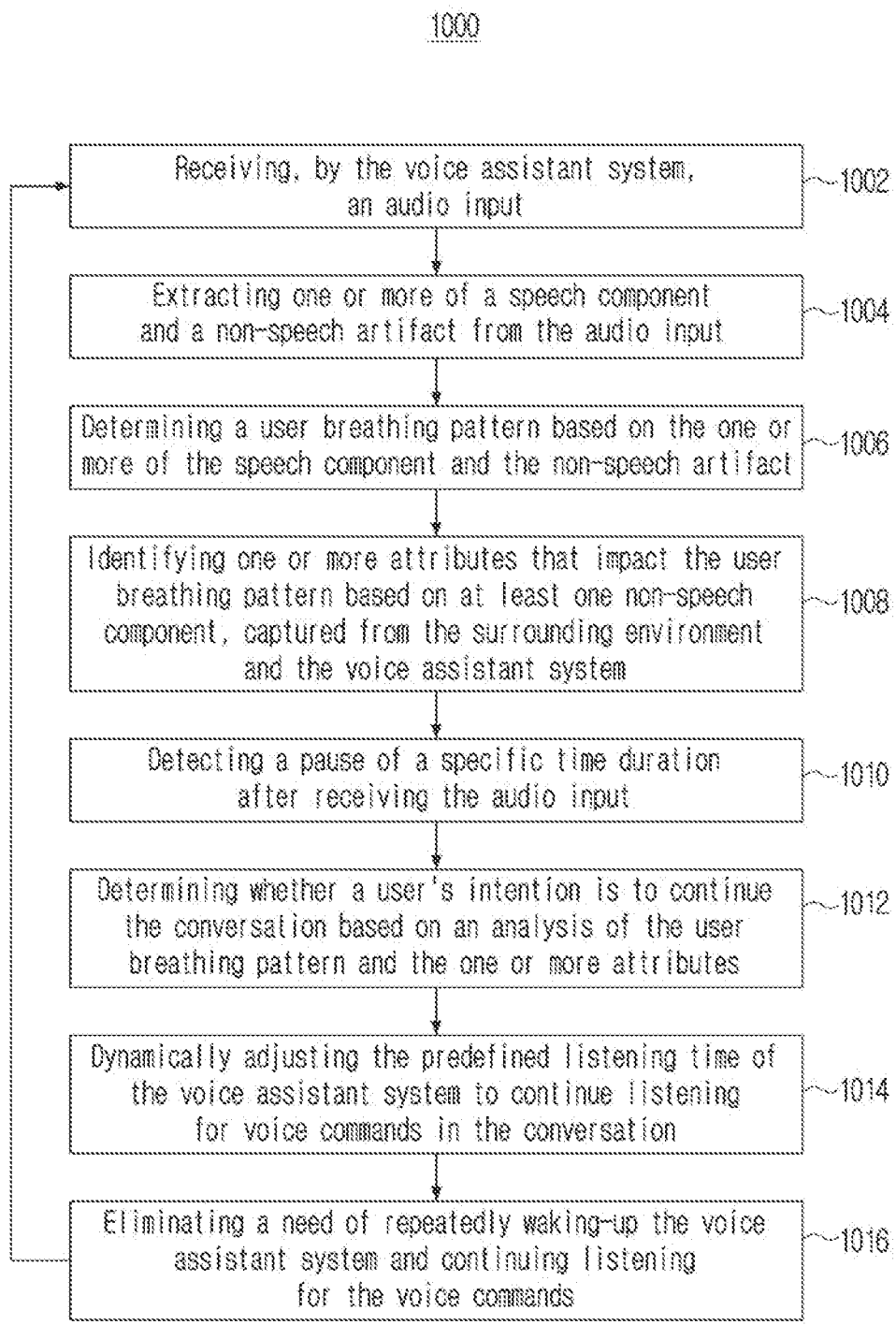
FIG. 10 illustrates an exemplary process flow for dynamically adjusting a predefined listening time of the voice assistant device, according to an embodiment.

FIG. 10 illustrates an exemplary process flow depicting a method 1000 for dynamically adjusting a predefined listening time of a voice assistant device, according to one embodiment of the disclosure. In one embodiment, the steps of the method 1000 may be performed by the system 203, which may be integrated within the voice assistant device 201 or provided separately.

At 1002, the method 1000 includes receiving, by the voice assistant device, an audio input. In one embodiment, the audio input may include a hot word indicating initiation of a conversation.

At 1004, the method 1000 includes extracting one or more of a speech component and a non-speech artifact from the audio input. In one embodiment, the speech component comprises one or more of phonemes and graphemes. The non-speech artifact comprises one or more of breathing sounds and non-lexical speaker noise.

At 1006, the method 1000 includes determining a user breathing pattern based on the one or more of the speech component and the non-speech artifact. In one embodiment, the user breathing pattern is determined using one of an audio spectrogram and a waveform analysis. Further, the user breathing pattern may be determined based on the at least one speech component and the at least one non-speech artifact using a neural network model. In one embodiment, the user breathing pattern identification may include identifying a duration and an amplitude of at least one inhalation and exhalation of the user while providing the audio input to the voice assistant device.

At 1008, the method 1000 includes identifying one or more attributes that impact the user breathing pattern based on at least one non-speech component, captured from the surrounding environment and the voice assistant device. In one embodiment, the at least one non-speech component comprises one or more of environment noise, microphone channel noise, and non-speech artifacts (e.g., non-lexical speaker noise such as hum, hmm, aaa, bb, etc. along with breathing sounds). Further, the one or more attributes comprise one or more of environmental parameters, user data, and voice assistant device data.

At 1010, the method 1000 includes detecting a pause of a specific time duration after receiving the audio input.

At 1012, the method 1000 includes determining, after detecting a pause in the audio input, whether a user's intention is to continue the conversation based on an analysis of the user breathing pattern and the one or more attributes. In one embodiment, the determining comprises determining an intention-to-speak more (ISM) coefficient based on the analysis of the user breathing pattern and the one or more attributes. In one embodiment, the determination of whether the user's intention is to continue conversation is based on the identified duration and the amplitude of the at least one inhalation and exhalation of the user while providing the input to the voice assistant device.

At 1014, the method 1000 includes dynamically adjusting the predefined listening time of the voice assistant device to continue listening for voice commands in the conversation based on a determination that the user's intention is to continue the conversation. The predefined listening time of the voice assistant device is one of a default listening time set during manufacturing of the voice assistant device, and a dynamically set listening time different from the default listening time.

In one embodiment, the dynamically adjusting the predefined listening time of the voice assistant device is based on the specific time duration of the pause to continue listening for voice commands in the conversation after the pause. In another embodiment, the dynamically adjusting predefined listening time of the voice assistant device is based on the ISM coefficient and a speech threshold value.

At 1016, the method 1000 includes eliminating a need of repeatedly waking-up the voice assistant device by suspending a requirement of receiving the hot word and continuing listening for the voice commands.

While the above discussed operations in FIG. 10 are shown and described in a particular sequence, the operations may occur in variations to the sequence in accordance with various embodiments.

The disclosure provides for various technical advancements based on the key features discussed above. The listening time of the voice assistant device may be automatically adjusted, leading to elimination of any wake-up command or trigger or hot word requirement for waking up the device again and again. This leads to smooth conversation of users with voice assistant devices. Further, in addition to various use cases discussed above related to pauses, the disclosure may also be useful for different age groups. For example, usually kids have short vocal cords, they produce short air waves, shorter breaths, and have multiple longer pauses while speaking. Age impacts pauses. The disclosure takes this into consideration during breathing pattern analysis and accordingly adjusts the listening time during pause.

While specific language has been used to describe the present subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

What is claimed is:

1. A method of dynamically adjusting a predefined listening time of a voice assistant device, the method comprising:
   receiving, by the voice assistant device, an audio input;
   extracting at least one of a speech component and a non-speech artifact from the audio input;
   determining a breathing pattern of a user based on (i) the at least one of the speech component and the non-speech artifact and (ii) an input speech feature vector corresponding to the audio input, wherein the breathing pattern of the user is output as a breath vector for further processing and the determining the breathing pattern employs speech feature vector-to-signal regression;
   identifying at least one attribute that impacts the breathing pattern based on at least one non-speech component, captured from an environment and the voice assistant device;
   determining, after detecting a pause in the audio input, whether an intention of the user is to continue a conversation based on an analysis of the breathing pattern and the at least one attribute; and
   dynamically adjusting the predefined listening time of the voice assistant device to continue listening for voice commands in the conversation based on a determination that the intention is to continue the conversation.

2. The method of claim 1, further comprising:
   detecting the pause of a specific time duration after receiving the audio input; and
   dynamically adjusting the predefined listening time of the voice assistant device based on the specific time duration of the pause to continue listening for the voice commands in the conversation after the pause.

3. The method of claim 1, further comprising:
   determining the breathing pattern using one of an audio spectrogram and a waveform analysis.

4. The method of claim 1, further comprising:
   determining an intention-to-speak more (ISM) coefficient based on the analysis of the breathing pattern and the at least one attribute; and
   dynamically adjusting the predefined listening time of the voice assistant device based on the ISM coefficient and a speech threshold value.

5. The method of claim 1, wherein the at least one non-speech component comprises at least one of an environment noise, microphone channel noise, and non-speech artifacts.

6. The method of claim 1, further comprising:
   suspending a requirement of receiving a hot word to continue listening for the voice commands, based on dynamically adjusting the predefined listening time of the voice assistant device.

7. The method of claim 1, wherein the at least one attribute comprises at least one of environmental parameters, user data, and voice assistant device data.

8. The method of claim 1, wherein the speech component comprises at least one of phonemes and graphemes, and wherein the non-speech artifact comprises at least one of breathing sounds and non-lexical speaker noise.

9. The method of claim 1 further comprising:
   determining the breathing pattern based on the speech component and the non-speech artifact using a neural network model.

10. The method of claim 1 further comprising:
    identifying a duration and an amplitude of at least one inhalation and exhalation of the user while providing the audio input to the voice assistant device; and
    determining whether the intention is to continue the conversation based on the duration and the amplitude.

11. The method of claim 1, wherein the predefined listening time of the voice assistant device is one of a default listening time set during manufacturing of the voice assistant device, and a dynamically set listening time different from a default listening time.

12. A system for dynamically adjusting a predefined listening time of a voice assistant device, the system comprising:

a receiving module configured to receive an audio input;
a breath analysis module configured to analyze the audio input;
a listening time adjustment module configured to adjust the predefined listening time of the voice assistant device;
a memory storing at least one instruction; and
at least one processor configured to execute the at least one instruction to:
receive, via the receiving module, the audio input;
extract, via the breath analysis module, at least one of a speech component and a non-speech artifact from the audio input;
determine, via the breath analysis module, a breathing pattern of a user based on (i) at least one of the speech component and the non-speech artifact and (ii) an input speech feature vector corresponding to the audio input, wherein the breathing pattern of the user is output as a breath vector for further processing and the determining the breathing pattern employs speech feature vector-to-signal regression;
identify, via the breath analysis module, at least one attribute that impacts the breathing pattern based on at least one non-speech component, captured from an environment and the voice assistant device;
determine, via the listening time adjustment module, after detecting a pause in the audio input, whether an intention of the user is to continue a conversation based on an analysis of the breathing pattern and the at least one attribute; and
dynamically adjust the predefined listening time of the voice assistant device, via the listening time adjustment module, to continue listening for voice commands in the conversation based on the intention is to continue the conversation.

13. The system of claim 12, further comprising:
a pause analysis module configured to detect the pause in the audio input,
wherein the at least one processor is further configured to execute the at least one instruction to:
detect, via the pause analysis module, the pause of a specific time duration after receiving the audio input, and
dynamically adjust the predefined listening time of the voice assistant device, via the listening time adjustment module, based on the specific time duration of the pause, to continue listening for the voice commands in the conversation after the pause.

14. The system of claim 12, wherein the at least one processor is further configured to execute the at least one instruction to:
determine, via the breath analysis module, an intention-to-speak more (ISM) coefficient based on the breathing pattern and the at least one attribute; and
dynamically adjust the predefined listening time of the voice assistant device, via the listening time adjustment module, based on the ISM coefficient and a speech threshold value.

15. The system of claim 12, wherein the at least one processor is further configured to execute the at least one instruction to:
suspend a requirement of receiving a hot word to continue listening for the voice commands, based on dynamically adjusting the predefined listening time of the voice assistant device.

16. A non-transitory computer readable medium for storing computer readable program code or instructions which are executable by one or more processors to perform a method of dynamically adjusting a predefined listening time of a voice assistant device, the method comprising:
receiving an audio input;
extracting at least one of a speech component and a non-speech artifact from the audio input;
determining a breathing pattern of a user based on (i) the at least one of the speech component and the non-speech artifact and (ii) an input speech feature vector corresponding to the audio input, wherein the breathing pattern of the user is output as a breath vector for further processing and the determining the breathing pattern employs speech feature vector-to-signal regression;
identifying at least one attribute that impact the breathing pattern based on at least one non-speech component, captured from an environment and the voice assistant device;
determining, after detecting a pause in the audio input, whether an intention of the user is to continue a conversation based on an analysis of the breathing pattern and the at least one attribute; and
dynamically adjusting the predefined listening time of the voice assistant device to continue listening for voice commands in the conversation based on a determination that the intention is to continue the conversation.

17. The non-transitory computer readable medium of claim 16, wherein the method further comprises:
detecting the pause of a specific time duration after receiving the audio input; and
dynamically adjusting the predefined listening time of the voice assistant device based on the specific time duration of the pause to continue listening for the voice commands in the conversation after the pause.

18. The non-transitory computer readable medium of claim 16, wherein the method further comprises:
determining an intention-to-speak more (ISM) coefficient based on the analysis of the breathing pattern and the at least one attribute; and
dynamically adjusting the predefined listening time of the voice assistant device based on the ISM coefficient and a speech threshold value.

19. The non-transitory computer readable medium of claim 16, wherein the method further comprises:
suspending a requirement of receiving a hot word to continue listening for the voice commands, based on dynamically adjusting the predefined listening time of the voice assistant device.

20. The non-transitory computer readable medium of claim 16, wherein the method further comprises:
identifying a duration and an amplitude of at least one inhalation and exhalation of the user while providing the audio input to the voice assistant device; and
determining whether the intention is to continue the conversation based on the duration and the amplitude.

* * * * *